United States Patent [19]

Geyer et al.

[11] Patent Number: 4,528,570
[45] Date of Patent: Jul. 9, 1985

[54] METHOD FOR TRANSFERRING OPTICALLY PRODUCED PICTURE RECORDS TO A MAGNETIC RECORD SUPPORT AND APPARATUS FOR PERFORMING THE METHOD

[75] Inventors: Christoph Geyer, Hamburg; Bernd Baader, Berlin, both of Fed. Rep. of Germany

[73] Assignee: Geyer-Werke GmbH, Berlin, Fed. Rep. of Germany

[21] Appl. No.: 421,033

[22] Filed: Sep. 22, 1982

[30] Foreign Application Priority Data

Nov. 9, 1981 [DE] Fed. Rep. of Germany ....... 3144871

[51] Int. Cl.³ ............................................. G01D 15/12
[52] U.S. Cl. ..................................... 346/74.2; 355/30
[58] Field of Search .................... 346/74.2; 355/30, 75

[56] References Cited

U.S. PATENT DOCUMENTS 4,082,447 4/1978 Pascuzzi ................................ 355/30

FOREIGN PATENT DOCUMENTS 2149290 4/1973 Fed. Rep. of Germany .

OTHER PUBLICATIONS

Stott, Printing Motion-Picture Films Immersed in a Liquid, J. of SMPTE, vol. 66, Oct. 1957, pp. 607–612.

Primary Examiner—Thomas H. Tarcza
Attorney, Agent, or Firm—Curtis, Morris & Safford

[57] ABSTRACT

A method for scanning picture records on film material and the transfer thereof to magnetic record supports, such as video tapes and the like is described, in which the original copy is guided, at least in the vicinity of the scanning window, through a printing liquid which is kept in a constant homogeneous state. The apparatus for performing the method is essentially characterized by a liquid chamber with associated scanning window and a drying chamber, combined in a compact block to give an integral unit.

11 Claims, 1 Drawing Figure

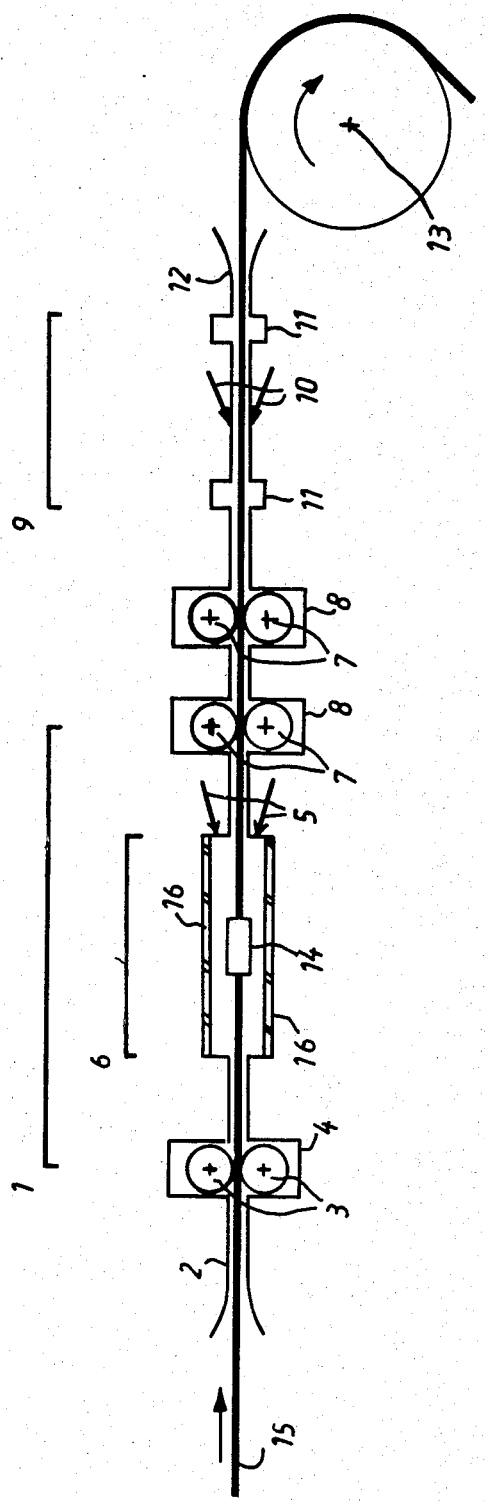

METHOD FOR TRANSFERRING OPTICALLY PRODUCED PICTURE RECORDS TO A MAGNETIC RECORD SUPPORT AND APPARATUS FOR PERFORMING THE METHOD

The invention relates to a method for transferring optically produced picture records to a magnetic record support and to an apparatus for performing this method.

When printing film material, it is considered particularly disadvantageous that the copy original e.g., a movie negative, particularly when it is old film material, is not free from surface damage of various types. Such damage in the form of scratches, microflaws due to ageing and other abrasions of the surface coating mean that during the mechanical printing process, the light striking the original is scattered or reflected in an uncontrolled manner on the surface damage of the film material. The light passing through the original is consequently attenuated in the vicinity of the abrasions or similar damage, so that on the film material which subsequently forms the print, such damage often appears more distinctly than on the original from which the print has been made.

To obviate this problem when printing optically produced picture records, namely roll film material on other film material, e.g. for the printing of a blank film, the procedure has hitherto been that the original entering the printing window is treated with a liquid along it surface and the refractive index of this liquid is at least approximately the same as that of the film material.

A known method is discussed, e.g., in Geman laid-open application 2149290 for printing film material using a printing liquid. An original positive or negative which may have surface damage, such as scratches and the like, receives the printing liquid during the printing process in a printing window. This process relies on the printing window being linked with a container containing a printing liquid. The original is continuously drawn from a supply roll and is initially guided by means of a film guide entering the container on curved path in such a way that it passes through the printing liquid in the container as a loose loop, is left in the latter and is then intermittently drawn through the printing window and on leaving the latter is finally passed outside the liqiud level over a drying means to a pick-up reel.

This known method for printing or reprinting film material has the great advantage that in the printing window the printing liquid is homogeneously distributed over the complete surface area of the film material, so that optical distortions, such as streaks and similar inhomogeneities, of the type occurring in other methods which are not of interest here, can be avoided. However, it has not hitherto been possible in connection with methods for transferring optically visible picture records on film materials to video tapes and similar magnetic record supports to use the hitherto known printing methods, because the problems involved in printing processes in which the film material is intermittently passed through the printing window for the printing process and the last-mentioned procedure in which there is a continuance guidance of the film material at a constant speed through the printing window in order to be electromagnetically transferred or recorded by scanning are fundamentally different from one another. Consequently, a comparison between these and a corresponding mere tranfer of the known procedure to the present scanning method is not possible.

Unlike film to film printing machines, in a film scanner, i.e. a film-to-magnetic-tape printing device or method, the film to be printed is driven by a capstan, rather than a Maltese Cross drive, and is passed at a constant speed and a continuous manner through the printing window, the drive using frictional forces between the surface of the capstan and the film to be printed. Any inconsistency, i.e. divergence from the constant transfer speed of the film material through the printing window, leads to picture errors of the recorded picture information on the video tape. There are many different causes of such picture errors. As a result of the elasticity of the film material, even minor changes in the tensile forces with which the film is drawn through the scanning window lead to length variations, which can cause considerable picture errors and this can be accompanied e.g. by a further disadvantageous influence in that the film material shrinks to a greater or lesser extent over its length.

In order to at least minimize the known picture erros, the procedure adopted when scanning film material in film scanners, i.e. on transferring optically visibly recorded picture information to electromagnetic record supports, namely video tapes, is that the distance between the scanning window and the driving roller for the film material, i.e., the capstan, is kept to the minimum, whilst taking great care with respect to the surface characteristics of the capstan. Even the slightest contamination can lead to inhomogeneities in the friction drive and therefore to errors in the synchronism of the film, thereby impairing the necessary picture quality for the scanning process. For the frictional drive of film material by means of the known capstan, its circumferential surface is provided with plastic coverings, which are attacked by the known printing liquids, so that this in itself makes it impossible to transfer the aforementioned wet printing process to film scanning processes, because after even a short time the surface covering of the capstan would lose its previous well-roundness and its defined friction values would become completely undefinable.

For the reasons given hereinbefore, in connection with scanning processes, i.e. the printing of film material on video magnetic tape, it has hitherto been conventional practice to use the dry method without a printing liquid, so that constant drive conditions for the capstan are obtained, i.e. constant friction values for the film tension. However, even in connection with film scanning processes attempts have already been made to apply a thin coating of printing liquid to the film to be printed, just before it enters the scanning window, e.g. by means of liquid-impregnated felt jaws. However, in this technique the thickness of the coating is no longer defined, (i.e., is not uniformly thick) even in the actual scanning window, which leads to streaking or similar inhomogeneities and consequently to printing errors. It has also been found that the either printing liquid over the short path length between the scanning window and the capstan would not be completely removed so that the capstan became unusable after a short time, or due to excessive action of drying air it was impossible to prevent a certain flapping of the film material, so that picture errors could not be prevented.

The problem of the present invention is therefore to provide a method and an apparatus for performing the same constructed in such a way that the advantages of the known liquid-printing chamber method during the printing of film to film material can be used in methods for scanning film material in film scanners during the transfer to magnetic record supports, without increasing the difficulties relative to the picture quality error.

The present solution of the problem makes it possible for the first time in a film scanning process to work with a liquid chamber filled with printing liquid, whereby particularly in the scanning window there is substantially no risk of air bubble formation and no increase in the picture errors hitherto encountered in known dry processes. In fact a certain improvement is obtained due to the synchronism and stabilization of the film material in the scanning window, as well as the guaranteed, absolute drying of the film material before it runs up onto the capstan, i.e. it is ensured that the printing liquid does not come into contact with the surface thereof. The use of pairs of sealing rollers running freely with the film material helps to stabilize the film synchronism in the vicinity of the scanning window. Furthermore a possible flapping of the film material in the vicinity of the drying chamber cannot be transferred to the vicinity of the scanning window, as a result of the presence of these sealing rollers. Due to the fact that the printing liquid is introduced behind the scanning window in the direction of movement of the film material and flows through counter to the direction of movement, possible surge-like pressure fluctuations, which could occur both via the liquid supply lines and via the suction device, are eliminated. The film material is dried over the shortest possible path length by hot air, which also acts thereon in counterflow. The drying chamber and liquid chamber, together with the various suction chambers, for the printing liquid on the one hand and the dry air on the other are combined to form a compact, space-saving, integral unit, which can easily be replaced if e.g. scanning windows of different sizes are desired.

It has been found that when using the apparatus according to the invention combined into a compact unit and whose scanning window is constructed in the form of a liquid chamber, the picture errors are reduced as compared with the dry process, which leads to a further improvement in the quality of the picture information content electromagnetically recorded on the video tape.

BRIEF DESCRIPTION OF THE DRAWING

The sole FIGURE shows an embodiment of the invention.

DETAILED DESCRIPTION OF THE INVENTION

An embodiment of this invention is described in detail in connection with the attached diagrammatic drawing FIGURE, which is a longitudinal section through the embodiment of the invention apparatus.

Film material 15 entes the apparatus from the left in the direction of the arrow in the FIGURE, and passes via a film intake channel 2 between a first pair of sealing rollers 3, which are pretensioned towards one another, but rotate in almost friction-free manner with relation film material 15, so that they do not influence the synchronism of the film material drive. Between the single pair of sealing rollers 3 according to the embodiment and a subsequently described pair of sealing rollers 7, there is an actual scanning window 6, which forms an integral part of a liquid chamber 1 and which is bounded by two glass bodies or plates 16 having an optionally focusing lens action. The two parallel glass bodies 16 through which the path of film material 5 runs approximately centrally, define a liquid chamber for the printing liquid 7 which is constantly and homogeneously applied to the film material during the scanning process. The printing liquid flows into the chamber of the scanning window 6 in accordance with the two arrows 5 counter to the direction of movement of film material 14 and after passing through the same in counterflow, is sucked out again in the vicinity of suction chambers 4, which also hold the sealing rollers 3. Immediately within the scanning window 6 and along a lateral edge of film material 15, there is provided a stabilizer 14, preferably in the form of a leaf spring, which slightly pretensions the film material in the scanning window laterally in one direction over a given length or presses it against the window by spring action. The lateral surface pressurizing of the film material by stabilizer 14 prevents film irregularities such as splices from making themselves noticeable as inhomogeneities in the scanning window, as is the case e.g. with punctiform pressure by laterally following resilient rollers.

On the outlet side, behind the liquid chamber 1, in the present embodiment there are two successive pairs of sealing rollers 7 disposed within associated suction chambers 8 which, like the pair of sealing rollers 3 are driven by and rotate with material 15 in a very low-friction manner and due to their squeezing action prevent any outflow of printing liquid from liquid chamber 1.

The film material 15, which is adequately predried by the squeezing action of the pairs of sealing rollers 7 then passes into a drying chamber 9 where, once again in counterflow as indicated by arrows, from air supply devices 10, hot air is supplied to the two surfaces of the film material. The maximum hot air temperature is 50° C., i.e. 122° F., in order to obviate disadvanatageous influences on said material and air entraining the residual moisture is removed via air suction devices 11 on either side of the air supply devices 10. Following drying chamber 9, the film material 15 passes via film discharge channel 12 directly to a capstan 13 from which, driven at constant speed, the film material is drawn through the aforementioned apparatus. The liquid chamber and the drying chamber, together with the pairs of sealing rollers and the suction chambers, starting from the film intake channel 2 and extending to the film discharge channel 12, form a compact block, formed from two substantially mirror-symmetrical halves, the axis of symmetry forming the film path.

The suction chambers 5, immediately adjacent to the film intake channel 2, not only seal the liquid chamber 1 against the intake channel, but as a result of the liquid flow counter to the film travel direction, help to ensure that any possible air bubbles in the liquid flow do not have a disadvantageous influence on the scanning process, at least in the vicinity of the scanning window 6. The film entering the drying chamber 9 is substantially free from printing liquid due to the pairs of sealing rollers 7 and the action of suction chambers 8. Any possible flapping of the film material due to the injection of air into drying chamber 9 is absorbed by the pairs of sealing rollers and as a result the film path in the vicinity of scanning window 6 remains level. Within the complete block, starting from the film intake channel 2 and extending up to the film discharge channel 12, film material is guided substantially without friction sliding on film guide pads.

Contrary to what is shown in the diagrammatic sketch, film guidance advantageously does not take place in rectilinear manner between film intake channel 2 and film discharge channel 12, but is instead curved at least in the vicinity of the liquid chamber and as a result it is possible to preselect the most suitable film pressure together with the frictional force of the capstan. Apart from the represented horizontal arrangement, it is also possible to fit the apparatus block comprising liquid chamber 1 and drying chamber 2 in a sloping or vertical manner in a corresponding scanning machine in front of the capstan.

We claim:

1. In a method for transferring optically produced picture records stored on windable roll film material onto a magnetic record support by suitable electronically processable scanning of the film material while the latter is frictionally driven in a predetermined direction at constant speed by a rotating capstan so that the film material moves at constant speed through a scanning window wherein said scanning takes place, the improvement wherein said scanning window defines a chamber containing a printing liquid in a uniform homogeneous volume, and said method includes immersing the film material in the volume of printing liquid on a film path passing through the scanning window, while stabilizing the constant-speed motion of the film material passing through the scanning window to maintain synchronism of the picture records on said film material, and drying said film material by blowing heated air onto both sides of the film material between said chamber and said capstan in a direction counterflow to the direction of travel of said film material.

2. In a method for transferring optically produced picture records stored on windable roll film material onto a magnetic record support by suitable electronically processable scanning of the film material while the latter is frictionally driven in a predetermined direction at constant speed by a rotating capstan so that the film material moves at constant speed through a scanning window wherein said scanning takes place, the improvement wherein said scanning window defines a chamber containing a printing liquid in a uniform homogeneous volume, and said method includes immersing the film material in the volume of printing liquid on a film path passing through the scanning window, while stabilizing the constant-speed motion of the film material passing through the scanning window to maintain synchronism of the picture records on said film material, and passing the printing liquid into said chamber in a direction counterflow to the predetermined direction of the film material.

3. In a method for transferring optically produced picture records stored on windable roll film material onto a magnetic record support by suitable electronically processable scanning of the film material while the latter is frictionally driven in a predetermined direction at constant speed by a rotating capstan so that the film material moves at constant speed through the scanning window wherein said scanning takes place, the improvement wherein said scanning window defines a chamber containing a printing liquid in a uniform homogeneous volume, and said method includes immersing the film material in the volume of printing liquid on a film path passing through the scanning window, while stabilizing the constant-speed motion of the film material passing through the scanning window to maintain synchronism of the picture records on said film material, passing said film material between sealing rollers as the film material enters the scanning window chamber, and passing said film material through further sealing rollers as it leaves said chamber.

4. A method according to claim 3, wherein said capstan follows said further sealing rollers on the film path of said film material, and further comprising drying said film material by blowing heated air onto both sides of the film material between said further sealing rollers and said capstan in a direction counterflow to the predetermined direction of the film material.

5. Apparatus for transferring optically produced picture records stored on windable roll film material onto a magnetic record support by electronically processable scanning of the film material while the latter is driven in a predetermined direction at uniform speed along a film path through the apparatus comprising a rotatable capstan frictionally engaging the film material to advance the same in said predetermined direction; a scanning window chamber in advance of said capstan defining a liquid volume containing a printing liquid and bounded by opposed transparent plates, first sealing roller means through which said film path enters said scanning window chamber, and second sealing roller means through which the film path exits said chamber, said first and second sealing roller means sealing the chamber against escape of the liquid; and means causing said liquid to flow in said chamber in a direction counterflow to said predetermined direction of said film material.

6. Apparatus according to claim 5, wherein said first and second sealing roller means each include a pair of sealing rollers contained in associated suction chamber means provided for suction of the printing liquid.

7. Apparatus according to claim 5, wherein the apparatus further comprises, disposed between said second sealing roller means and said capstan, a drying chamber containing hot air supply means for directing onto the surfaces of said film material hot air streams moving in counterflow to the predetermined direction of the film material and air suction devices bounding the drying chamber.

8. Apparatus according to claim 5, wherein said liquid chamber includes a stabilizing device for the film material disposed in the scanning window in alignment with the transparent plates, providing a uniform pretensioned stabilizing force to at least one edge of the film material.

9. Apparatus according to any one of claims 5 to 8, wherein said film path is arcuate at least within said liquid chamber.

10. Apparatus according to any one of claims 5 to 8, wherein said scanning window is arranged with said plates substantially horizontal.

11. A method according to claim 1, wherein said blowing includes heating said air to not more than 50° C.

* * * * *